(No Model.)  C. M. CONRADSON.  2 Sheets—Sheet 1.
HEAD STOCK FOR LATHES.

No. 497,630. Patented May 16, 1893.

Witnesses,
Sidney P. Hollingsworth
Horace A. Dodge.

C. M. Conradson,
Inventor,
by his attorneys,
Dodge & Sons.

(No Model.) 2 Sheets—Sheet 2.

C. M. CONRADSON.
HEAD STOCK FOR LATHES.

No. 497,630. Patented May 16, 1893.

Witnesses:
Sidney P. Hollingsworth
Horace A. Dodge.

C. M. Conradson,
Inventor;
by his attorneys,
Dodge & Sone

UNITED STATES PATENT OFFICE.

CONRAD M. CONRADSON, OF MADISON, WISCONSIN.

HEAD-STOCK FOR LATHES.

SPECIFICATION forming part of Letters Patent No. 497,630, dated May 16, 1893.

Application filed November 28, 1892. Serial No. 453,420. (No model.)

*To all whom it may concern:*

Be it known that I, CONRAD M. CONRADSON, a citizen of the United States, residing at Madison, in the county of Dane and State of Wisconsin, have invented certain new and useful Improvements in Head-Stocks for Lathes, of which the following is a specification.

My invention relates to lathes, and has reference more particularly, though not necessarily, to screw machines and similar machines in which the rod or stock to be acted upon is fed through a hollow arbor in the head-stock.

The present invention comprises a variable speed gear for imparting motion to the arbor or spindle.

Figure 1:
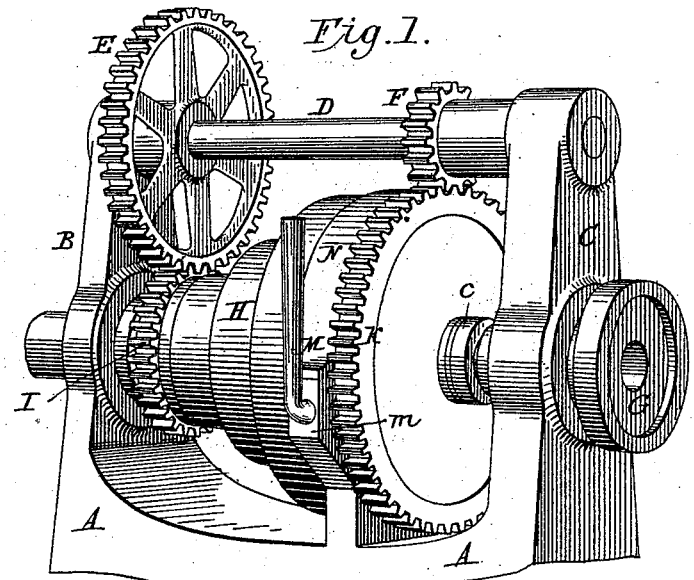
Figure 3:
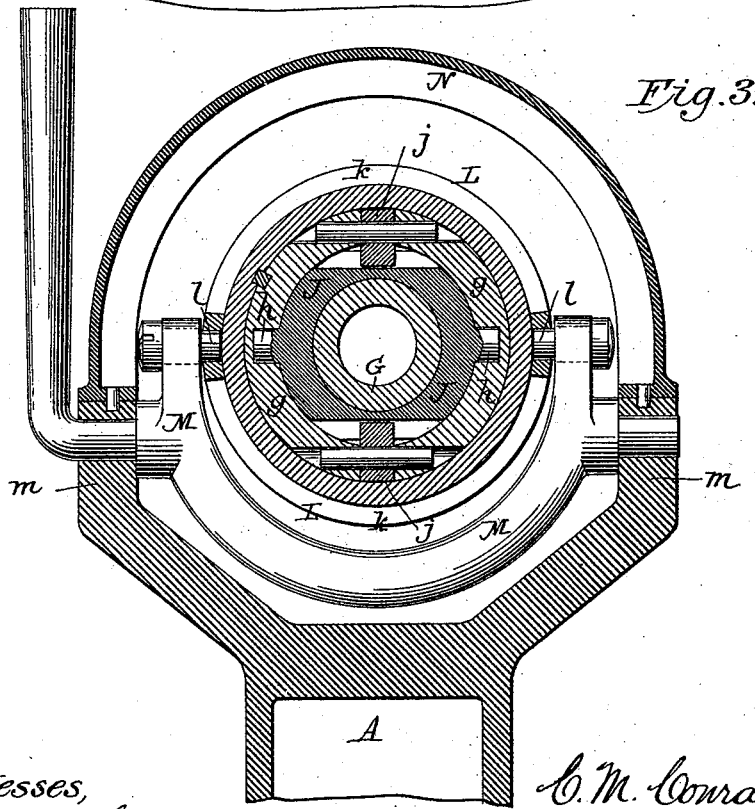
Figure 2:
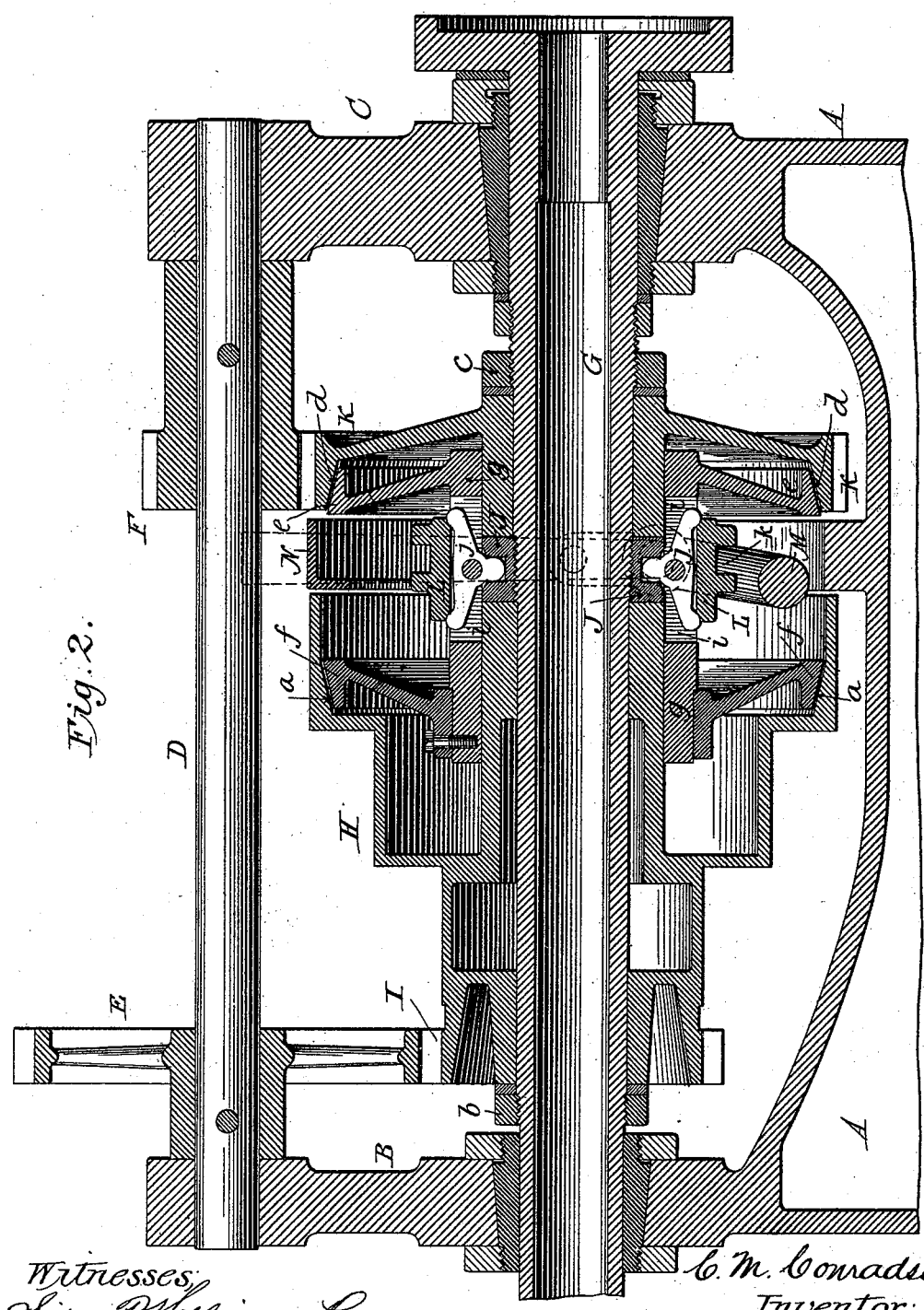

In the drawings,—Figure 1 is a perspective view of a portion of a turret lathe showing my improvements applied thereto; Fig. 2, a vertical longitudinal sectional view of the same; and Fig. 3 a vertical transverse sectional view to one side of the shifting or operating lever.

A indicates the main frame or bed of the machine, having the upright arms or standards B and C. In the upper ends of the standards is journaled the back-gear shaft D, to which are secured the gear wheels E and F. Below the shaft D is the hollow arbor G which is also journaled in the standards, or more properly speaking, in conical bushings carried by the standards, as shown in Fig. 2.

Mounted loosely upon the arbor or spindle G is a cone pulley H, which is fashioned at its smaller end into a gear wheel I to mesh with gear E. At its opposite or larger end, it is provided on its inner face with an inclined or friction surface $a$, as also shown in Fig. 2. This cone pulley H is prevented from moving endwise upon the shaft by the collar $b$ and ring J, both of which are screwed upon the shaft or arbor. There is also mounted loosely upon the arbor or spindle G, a gear wheel K designed to mesh with the back-gear F; said wheel K being prevented from moving endwise upon the shaft or arbor by means of the ring J and a collar $c$. This gear wheel K is provided on that face next to the cone pulley with an inclined or friction surface $d$, to receive one member or disk $e$ of the sliding clutch,—the other member or disk $f$ of the latter being designed to engage the friction surface $a$ in the cone pulley. The clutch is made in the form of a sleeve $g$ to encircle the hubs of the cone pulley H and gear wheel K, and also the ring J. It will be observed however, upon reference to Fig. 3, that the ring J has lugs or feathers $h$ which fit into grooves or recesses in the sleeve so that while the clutch may slide lengthwise relatively to the arbor to bring either of its disks $e$ or $f$ into engagement respectively with the gear wheel K or cone pulley H, it cannot turn or rotate independently of the arbor or of the ring J secured to the arbor.

Sleeve $g$, which carries at opposite ends the disks $e, f$, is slotted longitudinally as at $i$ to receive the triangular blocks $j$ which are pivoted in the slots or recesses. The apex of each block $j$ engages or enters into a socket or recess formed in the ring J, as shown in Fig. 2, and acts as a fulcrum when the block is rocked or tipped. The outer arms of each block project beyond the periphery of the sleeve $g$, in position to be acted upon by an encircling ring or band L whose inner edges are beveled to ride freely over and act upon the blocks $j$. It will be noticed upon reference to Fig. 2 that the band or ring is grooved circumferentially as at $k$ to receive the studs $l$ carried by the yoke or lever M shown in Figs. 1, and 2; the said yoke or lever being journaled in upwardly-extending arms or lugs $m$ on the frame. The handle or end of the yoke or lever projects outward within easy reach of the operator, as shown in Fig. 1.

The operation of the mechanism is as follows: With the parts in the position shown in Fig. 2, the cone pulley will turn freely upon the arbor, and, although motion be communicated from the cone pulley to the wheel K (through the back gear) no motion will be imparted to the arbor because of the fact that the said wheel turns loosely upon the shaft and because of the further fact that neither disk of the clutch is in engagement with the cone pulley nor the said wheel K. When it is desired to give a fast rotation to the arbor, the lever M is thrown to the left and carries with it the band L, and as the band thus moves, it rides over the blocks $j$ and tips or rocks the latter. As the blocks $j$ are fulcrumed in the ring J, the tipping or rocking of the blocks will cause a longitudinal movement of the clutch sleeve $g$ in which they are pivoted, and bring the friction disk $f$ into engagement with the friction face *a* of the cone pulley. As the clutch sleeve cannot rotate independently of the shaft or arbor, the motion imparted to the cone pulley will be transmitted directly to the arbor through the clutch and without bringing the gearing into use. When it is desired to secure power and slower speed, the lever M is thrown over to the right; and the clutch brought into engagement with the gear wheel K. Now if motion be imparted to the cone pulley, it will be transmitted from gear I, through gears E and F, to the gear K, and as the latter is locked to the clutch, slow motion will be imparted to the arbor.

Certain features of the present invention are applicable to machines which do not employ a hollow arbor, and hence I wish it understood that the hollow arbor is not to be considered essential except in those claims where it is specifically mentioned. So too, while I have shown two rocking or tipping blocks *j*, it is to be understood that the number may be increased or diminished without departing from the invention. When the band or ring L slides over the tail of the block or lever *j*, there is of course a temporary end thrust upon the collars *b* and *c* due to the reaction of the ring L; but it is only momentary and obviates end pressure upon the thrust collar of the spindle or arbor. The advantages of this driving gear over the ordinary gears, are simplicity in construction, ease of adjustment and operation, and freedom from small and delicate parts liable to wear and breakage, besides being noiseless.

In order to keep out the dirt and dust, a curved guard N is placed over the ring L as shown.

Having thus described my invention, what I claim is—

1. In combination with a hollow arbor or spindle; a pulley H and a gear wheel K mounted loosely thereon; a sliding clutch and external operating means located between the pulley and wheel; and a shaft provided with gears to engage the arbor pulley and wheel.

2. In combination with a hollow arbor G having the loose pulley H and gear wheel K; a clutch mounted upon the arbor to engage the pulley or the wheel at will; shaft D provided with gears E F; and a lever M located between pulley H and gear K to slide the clutch.

3. In combination with arbor G having the loose pulley H and gear wheel K, beveled or inclined on their opposing faces; the slidable clutch having the disks *e f*, and adapted to rotate with the arbor; a lever M between the disks for moving the latter into engagement, respectively, with the wheel K and pulley H; and a shaft D provided with the gears E F to engage the pulley and wheel.

4. In combination with arbor G having loose pulley H and wheel K; the sleeve *g* provided with disks *e f*; the collar J secured to the arbor and provided with lugs *h* to engage the sleeve; a block or lever *j* pivoted in the sleeve and fulcrumed in the collar; a sliding ring or band L to tip or rock the block or lever *j*; and means for actuating the ring or band.

5. In combination with arbor G having loose pulley H and wheel K; the sleeve *g* provided with disks *e f*; the collar J secured to the arbor and provided with lugs *h* to engage the sleeve; a block or lever *j* pivoted in the sleeve and fulcrumed in the collar; a sliding ring or band L to tip or rock the block or lever *j*; and a lever or yoke M journaled in the main frame to engage the ring or band and being extended out within reach of the operator.

6. In a lathe, the combination with the main frame, of the arbor mounted therein; the pulley H and gear wheel K mounted loosely upon the arbor; the back-gearing D, E, F; a clutch and operating means located between the pulley H and wheel K and adapted to lock either of the latter to the arbor.

In witness whereof I hereunto set my hand in the presence of two witnesses.

CONRAD M. CONRADSON.

Witnesses:
W. R. BAGLEY,
C. H. ALLYN.